United States Patent
Stokking et al.

(10) Patent No.: US 9,860,581 B2
(45) Date of Patent: Jan. 2, 2018

(54) CORRELATING TIMELINE INFORMATION BETWEEN MEDIA STREAMS

(71) Applicants: KONINKLIJKE KPN N.V., The Hague (NL); NEDERLANDSE ORGANISATIE VOOR TOEGEPAST-NATUURWETENSCHAPPELIJK ONDERZOEK TNO, Delft (NL)

(72) Inventors: Hans Maarten Stokking, Wateringen (NL); Mattijs Oskar Van Deventer, Leidschendam (NL); Ray Van Brandenburg, The Hague (NL)

(73) Assignees: KONINKLIJKE KPN N.V., The Hague (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 15/022,851

(22) PCT Filed: Sep. 5, 2014

(86) PCT No.: PCT/EP2014/068931
§ 371 (c)(1),
(2) Date: Mar. 17, 2016

(87) PCT Pub. No.: WO2015/039891
PCT Pub. Date: Mar. 26, 2015

(65) Prior Publication Data
US 2016/0234542 A1 Aug. 11, 2016

(30) Foreign Application Priority Data
Sep. 20, 2013 (EP) .................................. 13185428

(51) Int. Cl.
*H04N 7/173* (2011.01)
*H04N 21/43* (2011.01)
(Continued)

(52) U.S. Cl.
CPC ......... *H04N 21/4302* (2013.01); *G11B 27/10* (2013.01); *H04N 21/242* (2013.01);
(Continued)

(58) Field of Classification Search
CPC ............ H04N 21/4302; H04N 21/262; H04N 21/8358; H04N 21/8547; H04N 21/845;
(Continued)

(56) References Cited

U.S. PATENT DOCUMENTS 8,358,376 B2 7/2013 Oostveen et al.
8,705,195 B2 * 4/2014 Lockton .............. H04L 65/4076
360/65
(Continued)

FOREIGN PATENT DOCUMENTS

EP 1 773 072 A1 4/2007
JP 2003 259314 9/2003
(Continued)

OTHER PUBLICATIONS

Stokking H M et al: "IPTV inter-destination synchronization: A network-based approach", Intelligence in Next Generation Networks (ICIN). 2010 14th International Conference on. IEEE. Piscataway. NJ. USA. pp. 1-6 (2010).
(Continued)

*Primary Examiner* — Nnenna Ekpo
(74) *Attorney, Agent, or Firm* — Hamilton, Brook, Smith & Reynolds, P.C.

(57) ABSTRACT

A system is provided for enabling correlating timeline information between a first media stream and a second media stream, with the first media stream and the second
(Continued)

media stream being both associated with a common play-out timeline. The system comprises at least two content monitors, each arranged for providing a persistent identification of one or more media samples of a media stream. The system further comprises a correlation subsystem arranged for receiving a first persistent identification related in time with a second persistent identification, receiving a first timestamp value of the first media stream related in time with a second timestamp value of the second media stream, matching the first persistent identification to a first play-out time on the common play-out timeline and the second persistent identification to a second play-out time, and generating correlation information based on a comparison of the first play-out time with the second play-out time for enabling correlating the first timestamp value with the second timestamp value and thereby correlating the first timeline information with the second timeline information.

13 Claims, 4 Drawing Sheets

(51) Int. Cl.
| | | |
|---|---|---|
| *H04N 21/462* | (2011.01) | |
| *H04N 21/8358* | (2011.01) | |
| *H04N 21/845* | (2011.01) | |
| *H04N 21/8547* | (2011.01) | |
| *G11B 27/10* | (2006.01) | |
| *H04N 21/242* | (2011.01) | |
| *H04N 21/262* | (2011.01) | |

(52) U.S. Cl.
CPC ....... *H04N 21/262* (2013.01); *H04N 21/4307* (2013.01); *H04N 21/4622* (2013.01); *H04N 21/8358* (2013.01); *H04N 21/845* (2013.01); *H04N 21/8456* (2013.01); *H04N 21/8547* (2013.01)

(58) Field of Classification Search
CPC ... H04N 21/8456; H04N 21/242; G11B 27/10
USPC ..................................... 725/116, 18, 19, 131
See application file for complete search history.

(56) References Cited

U.S. PATENT DOCUMENTS

| 9,516,373 | B1* | 12/2016 | Abecassis | .......... H04N 21/4307 |
| 2002/0120925 | A1* | 8/2002 | Logan | ....................... A23L 2/52 |
| | | | | 725/9 |
| 2004/0148159 | A1* | 7/2004 | Crockett | ....................... 704/211 |
| 2006/0156374 | A1* | 7/2006 | Hu | .......................... H04N 7/163 |
| | | | | 725/135 |
| 2007/0110107 | A1 | 5/2007 | Tighe et al. | |
| 2009/0055417 | A1 | 2/2009 | Hannuksela | |
| 2012/0019352 | A1 | 1/2012 | Menard et al. | |
| 2015/0100981 | A1 | 4/2015 | Gao et al. | |
| 2016/0234570 | A1 | 8/2016 | Van Deventer et al. | |

FOREIGN PATENT DOCUMENTS

| JP | 2006-528859 A | | 12/2006 | |
| JP | 2007 208345 | | 8/2007 | |
| JP | 2011-501931 A | | 1/2011 | |
| JP | 2012-520648 A | | 9/2012 | |
| NL | WO 2005/011281 | * | 2/2005 | ............... H04N 7/24 |
| WO | WO 2005/011281 A1 | | 2/2005 | |
| WO | WO 2007/072326 A2 | | 6/2007 | |
| WO | WO 2009/053072 | | 4/2009 | |
| WO | WO 2010/106075 A1 | | 9/2010 | |
| WO | WO 2015/039888 | | 3/2015 | |
| WO | WO 2015/039891 A1 | | 3/2015 | |

OTHER PUBLICATIONS

Transmittal of the International Search Report and the Written Opinion of the International Searching Authority for PCT/EP2014/068931, entitled "Correlating Timeline Information Between Media Streams," dated Dec. 1, 2014.

Boronat, F., et al., "Multimedia Group and Inter-Stream Synchronization Techniques: A Comparative Study," *Information Systems*, 34: 108-131 (2009).

Extended European Search Report for corresponding EP Application No. 13185428.3, dated Feb. 19, 2014.

Transmittal of the International Search Report and the Written Opinion of the International Searching Authority for PCT/EP2014/068925, entitled "Correlating Timeline Information Between Media Streams," dated Dec. 1, 2014.

Extended European Search Report for EP Application No. 13185405.1, dated Feb. 19, 2014.

Non-Final Office Action for U.S. Appl. No. 15/022,863, entitled: Correlating Timeline Information Between Media Streams, dated Jun. 14, 2017.

* cited by examiner

CORRELATING TIMELINE INFORMATION BETWEEN MEDIA STREAMS

This application is the U.S. National Stage of International Application No. PCT/EP2014/068931, filed Sep. 5, 2014, which designates the U.S., published in English, and claims priority under 35 U.S.C. §§119 or 365(c) to EP Application No. 13185428.3, filed Sep. 20, 2013. The entire teachings of the above applications are incorporated herein by reference.

FIELD OF THE INVENTION

The invention relates to a system and method for correlating timeline information between a first media stream and a second media stream. The invention further relates to a media distribution network comprising the system, to a content monitor, timeline monitor or correlation subsystem as used in the system and to a computer program product comprising instructions for causing a processor system to perform the method. The invention further relates to a synchronization client.

BACKGROUND ART

Media content such as video content and audio content is commonly delivered to users in a digital form. If media content has a temporal aspect, and in particular is associated with a timeline which indicates how the media content is to be played out over time, such digital form is typically referred to as a media stream. Media streams may be delivered to a receiver of a user via a media distribution network. In particular, a media stream may be streamed to the receiver, which allows the receiver to begin play-out of the media stream before having received the entire media stream. However, the media stream may also delivered to the receiver of the user in a non-streaming manner, e.g., by being delivered to the receiver in the form of a file.

Examples of media streams include video streams such as camera-recorded or computer-rendered streams, audio streams such as microphone-recorded streams, timed text streams such as subtitle streams or social-media streams, timed events streams which show an advertisement image or perform an action at the receiver, and multimedia streams comprising different types of media streams.

Different media streams may be associated with a common play-out timeline in that there may be a temporal relationship between the media streams. In particular, media streams may be meant to be played out in a synchronized manner. This may be the case if the media streams concern different recordings of a same event, e.g., with a first media stream being a video stream and a second media stream being an audio stream, or the first media stream being a video stream representing a recording of the event from a first camera angle and the second media stream being also a video stream but representing a recording from a different camera angle.

Accordingly, there may be a need to enable play-out of different media streams in a synchronized manner. In addition, there may be a need to enable play-out of a same, similar or different media stream in a synchronized manner, e.g., across different receivers. The following are known examples where such media synchronization may be employed:

Social TV, in which synchronizing of a same or similar media streams across multiple TVs or other devices of multiple users is desired. The same or similar media streams may include technical variations of the same stream, but they may also include streams of a same event which nevertheless constitute different content, such as recordings from different camera angles of the same event.

Hybrid TV, in which synchronizing of multiple media streams, potentially coming via multiple routes, to a single TV is desired. Such multiple routes may include, e.g., Digital Video Broadcast (DVB), Internet Protocol (IP) multicast and IP unicast.

Companion screen, in which synchronizing a same or a different media stream between a TV and a companion screen, e.g., a tablet device, is desired. It is noted that the term 'companion screen' is also known as second screen.

It is noted that the above examples primarily refer to television, but that similar examples exist for other types of devices or receivers. Moreover, in the above examples, some or all of the media streams may be real-time or quasi-real time media streams. Additionally or alternatively, some or all of the media streams may be cached, e.g., by the media distribution network, or recorded, e.g., by a Personal Video Recorder (PVR), or constitute so-termed catch-up TV or user trick-mode media streams.

Broadcasters may employ media synchronization to offer synchronized services, where users can combine media streams via multiple routes and/or on multiple devices in various broadcaster-offered combinations. Such synchronization may take place in a studio system of the broadcaster where all media streams come together. Also, value-added-service providers may employ media synchronization to offer value-added synchronization services. Examples of value-added media streams include media streams which provide commenting, subtitling, audio description or sign-language interpretation of another media stream, e.g., a broadcasted video stream.

A problem associated with media synchronization may be that, whereas different media streams may be synchronized at the broadcaster or third party, they may lose their synchronicity while being distributed to the end user. For example, media streams may delivered via different routes. These routes have different delays because of differences in distance (transmission speed), multiplexing and routing (buffers), cached and recorded delivery, signal processing (e.g. mixing, transcoding), etc. Similarly, in the case of a value-added-service provider, the value-added media stream may be delivered from the service provider, while the original broadcast stream may be delivered from the broadcaster, i.e., via a different route.

An article "*Multimedia group and inter-stream synchronization techniques: A comparative study*" by F. Boronat et al., Elsevier Information Systems, 34, 2009, pp. 108-131, provides a comprehensive overview of known inter-destination synchronization techniques, i.e., synchronization between different end-terminals.

Most of the referenced inter-destination synchronization techniques make use of timeline information which is comprised in the media stream. Here, the term 'timeline information' refers to metadata which enables a receiver to play-out media samples of the media stream according to a play-out timeline. For example, if the media stream is delivered via the Real-time Transport Protocol (RTP), i.e., constitutes a RTP media stream, timeline information such as a RTP timestamp may be used. Other examples of timeline information include the so-termed Program Clock Reference (PCR), Presentation Time Stamp (PTS) and Decode Time Stamp (DTS). By comparing such timeline information across different receivers, appropriate stream adjustments may be calculated. To enable such comparing across receivers, synchronized wall-clocks may be used on the receivers, or alternatively, high-quality signaling connections with little and/or known delays. For example, a delay of the play-out time of the media stream may be achieved by buffering the media stream at the receiver.

It has been recognized that media streams may lose their original timeline information in a media distribution network. Such media distribution networks are typically owned by cable operators, telecom operators and internet service providers, which are typically different from the broadcasters or value-added-service providers. In such media distribution networks, a media stream may be modified in headends in order to make the media stream suited for distribution over the networks. These networks may be, e.g., DVB based (DVB-T, DVB-C, DVB-H), IP based (RTP/RTCP, IP multicast, IP unicast). Different codecs (MPEG 2, H.264, HEVC), transport technologies (broadcast, streaming, progressive download, adaptive streaming), etc, may be used in the final delivery of the media stream. During one or more of these processes, the media stream may be stripped of its original metadata. As a result, the original timeline information may not be included in the modified media stream. Instead, new metadata may be included which may include new timeline information.

Examples of such modifying of a media stream include:
(Re-)multiplexing. Most multiplexers for MPEG TS (Transport Stream) generate new PCR/PTS/DTS values while multiplexing. Typically, however, only the absolute values of PCR/PTS/DTS are changed, whereas their relationship across the media streams is maintained. As such, audio-video lip sync may be preserved.
Transcoding and re-encoding. Here, all relationships between incoming and outgoing media samples may be lost. For example, in case of a video stream, frames of the video stream may become a different type, e.g. from I-frame to B-frame. In addition, if the frame-rate changes during transcoding and re-encoding, the one-to-one relationship between incoming and outgoing frames may be lost. Furthermore, the whole container of the media stream may be changed, e.g. from so-termed TS to ISOBFF, thereby changing also the type of timeline information.
Technical or business reasons. Media distribution networks may refuse to pass timeline information. For instance, a DVB Synchronized Auxiliary Data Packet Identifier (SAD-PID) may be stripped from a Transport Stream (TS) by default. This may be on purpose, e.g. for said business reasons, or the parameter may just not be supported by the current network, thereby constituting a technical reason.

In addition to media streams being modified and thereby losing their original timeline information, such timeline information may also inherently differ between different media streams which are intended to be played synchronously but which are already initially, e.g., at a media stream origination, not provided with common timeline information. Also here there may be a need for media synchronization.

WO 2010106075 A1 describes a method and a system for inter-destination media synchronization of at least a first and a second (media) stream, wherein the second stream is the output stream of a stream modification unit using the first stream as an input stream. The method comprises the steps of: providing first arrival time information of a packet in the first stream arriving at a first synchronization point and second arrival time information of a packet in the second stream arriving at a second synchronization point; providing synchronization correlation information on the synchronicity relationship between said input stream and said output stream; and, calculating delay information on the basis of the first and second arrival time information and the synchronization correlation information.

SUMMARY OF THE INVENTION

Although WO 2010106075 A1 enables inter-destination media synchronization between modified and unmodified media streams or between two differently modified streams, it would be advantageous to provide a system or method which further improves on at least one aspect of said media synchronization.

A first aspect of the invention provides a system for enabling correlating timeline information between a first media stream and a second media stream, the first media stream and the second media stream being both associated with a common play-out timeline, and the system comprising:
at least two content monitors, each arranged for providing a persistent identification of one or more media samples of a media stream, the persistent identification being data which can be reproducibly obtained using the media stream, wherein the at least two content monitors comprise a first content monitor for providing a first persistent identification of the first media stream and a second content monitor for providing a second persistent identification of the second media stream; and
a correlation subsystem arranged for:
i) receiving the first persistent identification related in time with the second persistent identification,
ii) receiving a first timestamp value from timeline information of the first media stream related in time with a second timestamp value from timeline information of the second media stream,
iii) matching the first persistent identification to a first play-out time on the common play-out timeline and the second persistent identification to a second play-out time on the common play-out timeline, and
iv) generating correlation information based on a comparison of the first play-out time with the second play-out time for enabling correlating the first timestamp value with the second timestamp value and thereby correlating the first timeline information with the second timeline information.

Embodiments are defined in the dependent claims.

The above measures provide a system which comprises at least two content monitors. Each of the two content monitors provides a persistent identification of one or more media samples of a different media stream. Here, the term 'persistent identification' refers to data which may be reproducibly obtained using the media stream. Examples of persistent identifications include fingerprints, watermarks as well as markers which are included in a persistent manner in the media stream. It will be appreciated that such identifications may be persistent in that they may be robust against various processing to which the media stream may be subjected during distribution of the media stream, e.g., via a media distribution network. Such identifications may also be persistent in that they may be obtained indirectly from the media stream, e.g., from a captured play-out of a receiver. As such, the first content monitor provides at least a first persistent identification of one or more media samples of the first media stream while the second content monitor provides at least a second persistent identification of one or more media samples of the second media stream.

Furthermore, a correlation subsystem is provided which receives the first persistent identification from the first content monitor and the second persistent identification from the second content monitor. Both persistent identifications are received by the correlation subsystem related in time. Here, the term 'related in time' refers to the correlation subsystem being able to link the first persistent identification to the second persistent identification by means of a time domain property or parameter, such as a common timestamp or common reception time.

Since both media streams are associated with a common play-out timeline, there may be a need to play-out or otherwise process both media streams in a synchronized manner. However, both media streams may comprise different timeline information, e.g., by having different timestamp values for the same location, i.e., same part of the content of the media stream, included in the media stream.

The correlation subsystem is arranged for matching the first persistent identification to a first play-out time on the common play-out timeline and the second persistent identification to a second play-out time on the common play-out timeline. For example, if both persistent identifications comprise a same fingerprint, this may indicate that both persistent identifications relate to a same play-out time on the common play-out timeline. However, said matching may also be performed on the basis of identification information. The identification information may comprise, e.g., a plurality of persistent identifications and an associated plurality of play-out times on the common play-out timeline, thereby enabling the correlation subsystem to match both persistent identifications to different play-out times on the common play-out timeline.

The correlation subsystem may further receive a first timestamp value from timeline information of the first media stream and a second timestamp value from timeline information of the second media stream. As such, each timestamp value is obtained from timeline information comprised in the respective media stream, such as presentation timestamps or RTP timestamps. Both timestamp values are received by the correlation subsystem related in time. Again, the term 'related in time' refers to the correlation subsystem being able to link the first timestamp value to the second timestamp value by means of a time domain property or parameter. Both timestamp values may relate to, e.g., a current media sample of the respective media stream. Here, the term 'current media sample' refers to a media sample being currently played out or in another way being currently processed.

Having established the first play-out time and the second play-out time, the correlation subsystem may generate correlation information based on a comparison of the first play-out time with the second play-out time. The correlation information enables correlating different timeline information between the first media stream and the second media stream. Here, the term 'correlating' refers to the system enabling the timeline information of the first media stream to be related to the timeline information of the second media stream. Accordingly, timestamps or other timing data from the timeline information of the first media stream may be related to timing data from the timeline information of the second media stream, and vice versa.

This is possible as the timestamp values of both media streams are received related in time. Accordingly, the system is enabled to determine a time difference between both media streams in terms of a timestamp value which exists at a first moment in time. Moreover, the persistent identifications of both media streams are received related in time and are both matched to a common play-out timeline. Accordingly, the system is enabled to determine a time difference between both media streams in terms of play-out. If the above is performed during playback or other processing of both media streams, both differences are related to each other in that the difference in timestamp value corresponds to the difference in play-out irrespective of the exact moment in times when both differences determined. Accordingly, it is not needed for the timestamp value of a media stream to be obtained at a same moment in time nor for a same part (e.g., same media sample) of the media stream as the persistent identification of the media stream. As a result of the above, the timeline information of the first media stream may be correlated to the timeline information of the second media stream in that at least the first timestamp value may be correlated to the second timestamp value, with said correlation being typically generalize-able to enable the correlation of the entire timeline information between both media streams. Accordingly, after having matched persistent identifications of the respective media streams once or a limited number of times, the timeline information of both media streams can be directly correlated, i.e., without further use of persistent identifications.

The inventors have recognized the following. Obtaining a persistent identification of one or more media samples of a media stream may be relatively computationally complex compared to determining a timestamp value from timeline information comprised in the media stream. Similarly, a persistent identification may require more bandwidth to transmit than a timestamp value. As such, it may be disadvantageous to require all devices to which media synchronization is to be applied to provide such persistent identifications. However, the inventors have recognized that groups of such devices may have access to a same version of a first media stream in that it comprises same timeline information. For example, a group of devices may be located in a same segment of a media distribution network. Here, the term segment refers to a portion of the media distribution network across which a media stream is distributed by comprising, at a first boundary, an input for the media stream and, at a second boundary, at least one output or end-point for the media stream, with the media stream at the input and output being essentially the same. As such, the timeline information of the media stream is maintained during distribution across the segment.

Even though media synchronization between a first group of devices in a first segment and a second group of devices in a second segment on the basis of only timeline information may be unreliable for the earlier mentioned reasons, the present invention enables such media synchronization by providing a first content monitor for monitoring the first media stream, e.g., in or near the first segment, and a second content monitor for monitoring the second media stream, e.g., in or near the second segment. It is therefore not necessary for all the devices within the first segment and/or second segment to obtain and provide such persistent identifications. Rather, after having combined the information received from the content monitors and associated timestamps, media synchronization may be subsequently provided between both segments, i.e., on the devices in both segments, on the basis of said devices providing timeline information of the respective media streams which may then be correlated by the correlation subsystem.

As such, the present invention may enable synchronizing of media streams with previously unrelated timestamps, either on one device to provide inter-stream synchronization or lip-sync, or between devices to provide either inter-stream and inter-device synchronization, such as companion screen synchronization, or inter-destination synchronization. In particular, the present invention may enable media synchronization between a first media stream and a second media stream on the basis of timeline information of the respective media streams without the unreliability typically associated with such media synchronization due to the fact that the timeline information may be different between such media streams. A further advantage may be that devices to which such media synchronization is to be applied may not need to provide persistent identifications. Rather, such devices may suffice with providing timeline information of a media stream, such as a timestamp associated with a current media sample of the media stream. As such, less bandwidth and/or less computational complexity is required to effect the media synchronization across a group of devices.

The inventors have further recognized that, although obtaining the persistent identification (henceforth: content monitoring) and the timestamp value from the timeline information (henceforth: timeline monitoring) of a same media stream may be performed by a single stream monitor which obtains a persistent identification from the media stream and a timestamp value from the timeline information of the media stream, this functionality may also be split over two different entities, namely the aforementioned content monitor and another entity, e.g., a timeline monitor. By ensuring that the information of different content monitors and different timeline monitors is received by the correlation subsystem related in time, the persistent identification obtained from a content monitor can again be associated with the timestamp value obtained from, e.g., a timeline monitor monitoring the same media stream. This provides the additional advantage that both functions of the stream monitor, i.e., the content monitoring and the timeline monitoring, do not have to be performed at a same location. In particular, it may not be necessary for the content monitor to have access to the (bitstream of the) media stream itself. Rather, in order to obtain a persistent identification, it may suffice to, for example, obtain a captured output of a play-out of the media stream. As such, it may even not be necessary for the content monitor to be part of the media distribution network nor its receivers. Rather, the content monitor may be implemented in a separate device, such as, e.g., a capture device which obtains the persistent identification by capturing an output of a play-out of the media stream by a receiver. It will be appreciated that various other advantageous uses of not having to perform the content monitoring and the timeline monitoring at a same location may be conceived by the skilled person.

In an embodiment, the first persistent identification and the second persistent identification may be received related in time based on each of the at least two content monitors being arranged for:

i) determining a wallclock timestamp value associated with the persistent identification based on a clock signal which is synchronized between the at least two content monitors, and ii) providing the wallclock timestamp value together with the persistent identification to the correlation subsystem.

Here, the term 'wallclock' refers to a locally available clock on the device. Typically, the system clock is used for this, but a wallclock can also be part of an application keeping its own time. The wallclock may be giving actual time, i.e. be globally synchronized to the correct actual time. But, synchronized wallclocks may also be incorrect in absolute value, i.e. showing a time well ahead or behind actual time, but still be synchronized to one another. By providing the wallclock timestamp value together with the persistent identification to the correlation subsystem, the correlation subsystem is enabled to relate two different persistent identifications in time, namely by relating the associated wallclock timestamp values in time. It will be appreciated that wallclock timestamp values can be easily related in time as the difference between the wallclock timestamp values directly represents this relation in time. As such, the correlation subsystem may determine whether persistent identifications were obtained at a same moment in time, or if they were obtained at different moments in time, what the difference is between said moments in time.

In an embodiment, the first persistent identification and the second persistent identification may be received related in time based on the at least two content monitors synchronously in time obtaining the persistent identification and providing the persistent identification to the correlation subsystem. By synchronously in time obtaining the persistent identification and synchronously in time providing the persistent identification to the correlation subsystem, both persistent identifications are automatically related in time in that they are synchronously, i.e., simultaneously or at a known delay, obtained and provided. It is therefore not needed for the content monitors to provide wallclock timestamp values together with the persistent identification. It is noted that said synchronicity may be established either by the correlation subsystem, e.g., by the correlation subsystem simultaneously requesting information from the content monitors and timestamping the received information with a common timestamp. Said synchronicity may also be established by the content monitors themselves, e.g., by the content monitors simultaneously sending information to the correlation subsystem triggered by or otherwise linked to a synchronized wallclock.

In an embodiment, the system may further comprise at least two timeline monitors, each of the at least two timeline monitors being arranged for providing a timestamp value from timeline information of a media stream, wherein the at least two timeline monitors comprise a first timeline monitor for providing the first timestamp value of the first media stream and a second timeline monitor for providing the second timestamp value of the second media stream. By providing a timeline monitor, a separate entity from the content monitor is provided for obtaining the timestamp value from timeline information of a media stream. Accordingly, the timeline monitor may be separately implemented from the content monitor, e.g., in a receiver. Nevertheless, the content monitor and the timeline monitor may, by jointly monitoring a media stream, effectively provide a (distributed) implementation of a stream monitor.

In an embodiment, the first timestamp value and the second timestamp value may be received related in time based on each of the at least two timeline monitors being arranged for:

i) determining a wallclock timestamp value associated with the first timestamp value based on a clock signal which is synchronized between the at least two timeline monitors, and ii) providing the wallclock timestamp value together with the timestamp value to the correlation subsystem.

By providing the wallclock timestamp value together with the first mentioned timestamp value to the correlation subsystem, the correlation subsystem is enabled to relate two different timestamp values in time, namely by relating the associated wallclock timestamp values in time. Here, the timestamp values from the timeline information of the media stream may be considered as 'content' timestamp values to semantically differentiate them from the wallclock timestamp values. It will be appreciated that wallclock timestamp values can be easily related in time as the difference between the wallclock timestamp values directly represents this relation in time. However, the timeline information of both media streams may be different and as such yield content timestamp values which are, on the face of it, unrelated. As such, the correlation subsystem may determine whether two timestamp values were obtained at a same moment in time from the timeline information, or if they were obtained at different moments in time, what the difference is between said moments in time.

In an embodiment, the first timestamp value and the second timestamp value may be received related in time based on each of the at least two timeline monitors synchronously in time obtaining the timestamp value and providing the timestamp value to the correlation subsystem. By synchronously in time obtaining the timestamp values and synchronously in time providing the timestamp values to the correlation subsystem, both timestamp values are automatically related in time in that they were synchronously, i.e., simultaneously or with a known delay, obtained and provided. It is therefore not needed for the timeline monitors to provide wallclock timestamp values together with the (content) timestamp values. It is noted that said synchronicity may be established either by the correlation subsystem, e.g., by the correlation subsystem simultaneously requesting information from the timeline monitors and timestamping the received information with a common timestamp. Said synchronicity may also be established by the timeline monitors themselves, e.g., by the timeline monitors simultaneously sending information to the correlation subsystem triggered by or otherwise linked to a synchronized wallclock.

In an embodiment, the first media stream may be distributed via a first segment of a media distribution network and the second media stream may be distributed via a second segment of the media distribution network, and the first content monitor and the first timeline monitor may be associated with the first segment and the second content monitor and the second timeline monitor may be associated with the second segment. Here, the term 'associated with a segment' of the media distribution network refers to being comprised in the segment as well as being located adjacent to the segment. For example, a timeline monitor may be comprised in a receiver in the segment, whereas the content monitor may be implemented in a capture device which is arranged for capturing an output of a play-out of the media stream by the receiver, but as such, may be considered not to be part of the media distribution network itself. It is noted that the segments may be formed by different head-ends in the media distribution network. Here, the term 'head-end' refers to a functional entity in the media distribution network which acts as a distribution point for a plurality of devices, such as a plurality of receivers. By providing a first distributed stream monitor, i.e., a first content monitor and a first timeline monitor, in the first segment and a second distributed stream monitor, i.e., a second content monitor and a second timeline monitor, in the second segment, correlation information may be obtained which enables media synchronization between the first media stream and the second media stream across all devices of both segments. It may therefore not be needed for said devices to provide persistent identifications themselves to the correlation subsystem.

In an embodiment, the media distribution network may comprise a synchronization subsystem for performing a synchronization action with respect to the second media stream, and the correlation subsystem may be arranged for providing timing information for enabling the synchronization subsystem to perform the synchronization action based on the timeline information of the first media stream. Here, the synchronization subsystem is a 'subsystem' in that it may, but may not have to be part of the media distribution network and/or the system as claimed. The synchronization subsystem may be of the client-server type in that it comprises a synchronization server and a plurality of synchronization clients. The correlation subsystem may interact with entities of the synchronization subsystem to enable a synchronization action to be performed with respect to the second media stream on the basis of the timeline information of the first media stream. It will be appreciated that such interaction may take various forms, such as a query-response type of interaction in which an entity of the synchronization subsystem provides a query comprising a timestamp from the timeline information of the second media stream and the correlation subsystem provide a response in the form of timing information which comprises a timestamp from the timeline information of the first media stream which relates to a same play-out time on the common play-out timeline. The format of such query-response type of interaction may be specified by, e.g., an Application Programming Interface (API). Effectively, the correlation subsystem may provide a translation service for entities of the synchronization subsystem, the translation service comprising translating timestamps and other timing data from timeline information of the second media stream to the timeline information of the first media stream. It is noted that other methods to supply the correlation information is to send the complete correlation information from the correlation subsystem to the synchronization subsystem, and having the synchronization subsystem performing the necessary translations.

In an embodiment, the synchronization action may be one of the group of:
  a media stream buffering or skipping ahead to enable synchronized playback of the first media stream and/or the second media stream on a plurality of receivers,
  a media stream buffering or skipping ahead to enable synchronized playback of the first media stream with the second media stream on a receiver, and
  a triggering of an application on a receiver in synchronization with a media stream play-out on the receiver.

Synchronization actions with respect to media stream buffering may be desirable in order to effect media synchronization in the earlier mentioned Social TV scenario in which synchronizing of a same or similar media streams across multiple receivers of multiple users is desired, in the Hybrid TV scenario in which synchronizing of different media streams to a single receiver is desired, and in the companion screen scenario in which synchronizing a same or a different media stream between a TV receiver and a companion screen is desired. It is noted that the media stream buffering may be, but may not need to be, effected on the receiver itself, i.e., using an internal synchronization client. For example, the media stream buffering may also be performed by a synchronization client which is comprised in the media distribution network upstream of the receiver. Synchronization actions with respect to a triggering to an application may be desirable to effect synchronized presentation of quiz questions, advertisements, etc, or trigger the application to perform other types of actions.

In an embodiment, one or more of the at least two content monitors may be arranged for obtaining the persistent identification of the media stream from a capture of a play-out of the media stream. Accordingly, it may not be needed for the content monitor to access the (bitstream of the) media stream itself. This allows the content monitor to be easily added without having to modify the media distribution network itself. For example, the content monitor may be implemented on a tablet device which may perform video fingerprinting or detect a video watermark using a camera recording of the play-out or audio fingerprinting using a microphone recording of the play-out.

In an embodiment, the persistent identification may be one of the group of: a fingerprint, a watermark and a marker, of the one or more media samples. Fingerprints and watermarks are well known for their ability to provide a persistent identifications of one or more media samples of a media stream as each yields data which can be reproducibly obtained using the media stream during distribution of the media stream. Also markers which are included in the media stream in a persistent manner enable such data to be reproducibly obtained from the media stream. It is noted that if markers are included in a media stream, this may require the content monitor to have access to this media stream, e.g., to the bitstream of the media stream.

In an embodiment, the second media stream may be a modified version of the first media stream, said modified version comprising timeline information which differs from the timeline information of the first media stream. The system may be used to enable correlating timeline information between a first media stream and a modified version of the first media stream. Such modifications may frequently occur during distribution of media streams. Accordingly, the system may enable media synchronization of a modified version of the first media stream on the basis of the timeline information of the (unmodified) first media stream since use is made of persistent identifications which are reproducible from both the unmodified as well as the modified version of the first media stream, i.e., are resistant to such modifications.

In another aspect of the present invention, a media distribution network may comprise the system.

In another aspect of the present invention, a content monitor, timeline monitor and/or correlation subsystem may be provided as used in the system.

In another aspect of the present invention, a synchronization client may be provided for use with the system, the synchronization client being part of the synchronization subsystem, and wherein the synchronization client being arranged for identifying the segment in which the synchronization client is comprised to the correlation subsystem to enable receiving the timing information for the segment from the correlation subsystem. The correlation subsystem may be arranged for providing timing information for use in different segments of the media distribution network based on different content monitors and timeline monitors comprised in the different segments. By identifying the segment in which the synchronization client is comprised, e.g., by reporting a manually configured parameter, a parameter from an Electronic Program Guide (EPG), a parameter from the received stream, etc, the correlation subsystem is enabled to provide the appropriate timing information to the synchronization client, i.e., which is based on the information of a content monitor and timeline monitor which are comprised in the segment of the synchronization client.

In another aspect of the present invention, a method is provided for enabling correlating timeline information between a first media stream and a second media stream, the first media stream and the second media stream being both associated with a common play-out timeline, and the method comprising:
receiving a first persistent identification of the first media stream related in time with a second persistent identification of the second media stream, each of said persistent identifications being data which can be reproducibly obtained using the respective media stream;
receiving a first timestamp value from timeline information of the first media stream related in time with a second timestamp value from timeline information of the second media stream;
matching the first persistent identification to a first play-out time on the common play-out timeline and the second persistent identification to a second play-out time on the common play-out timeline, and
generating correlation information based on a comparison of the first play-out time with the second play-out time for enabling correlating the first timestamp value with the second timestamp value and thereby correlating the first timeline information with the second timeline information.

In another aspect of the present invention, a computer program product may be provided comprising instructions for causing a processor system to perform the method.

It will be appreciated by those skilled in the art that two or more of the above-mentioned embodiments, implementations, and/or aspects of the invention may be combined in any way deemed useful.

Modifications and variations of the method and/or the computer program product, which correspond to the described modifications and variations of the system, can be carried out by a person skilled in the art on the basis of the present description.

The invention is defined in the independent claims. Advantageous yet optional embodiments are defined in the dependent claims.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
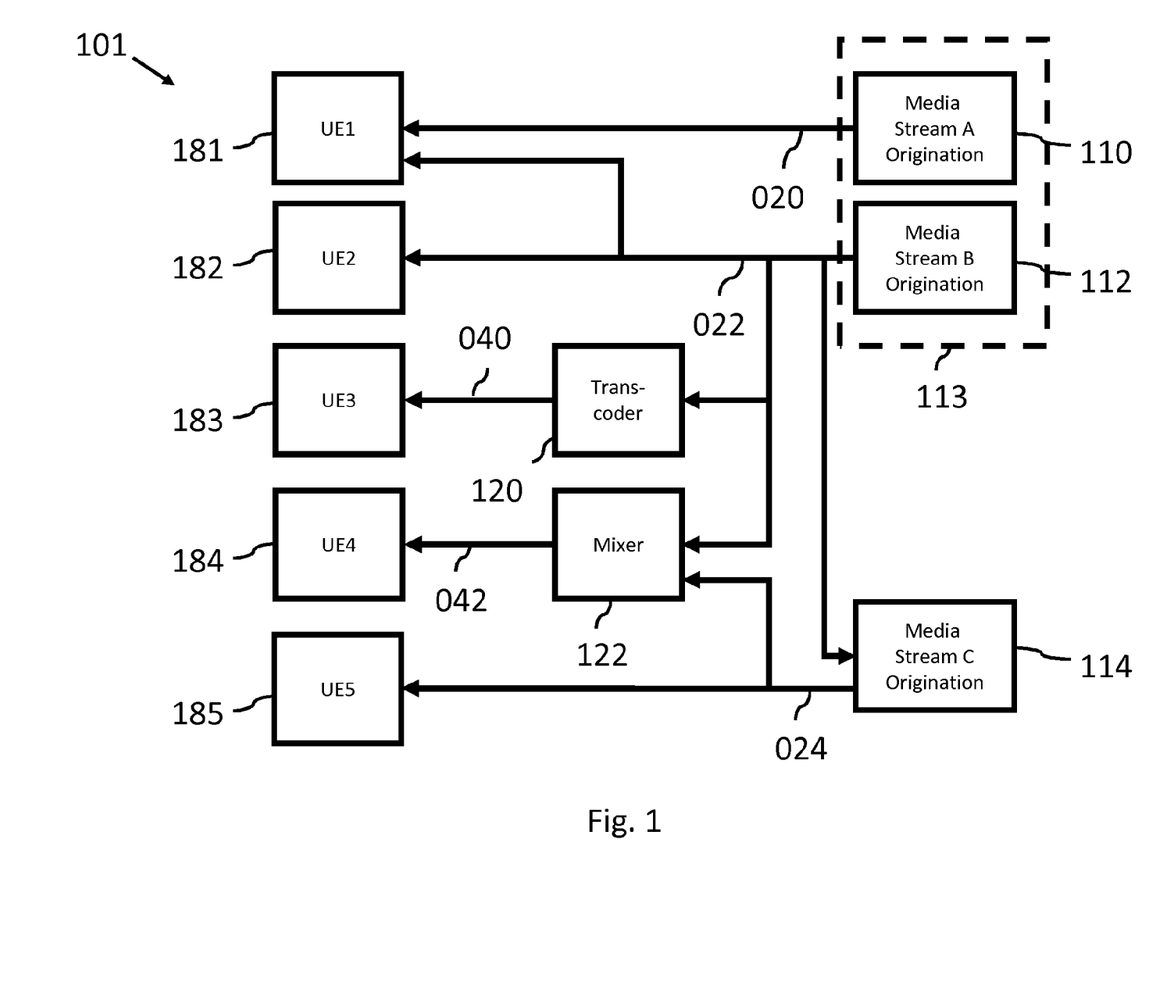
FIG. 1 illustrates a number of use-cases for media synchronization.

FIG. 1 shows a media distribution network 101 in which a plurality of media streams 020-024 are delivered to various User Equipment (UE) 181-185. Here, the term User Equipment refers to a device of an end-user which is arranged for receiving and typically also playing-out one or more media streams. Such a device is also referred to as a receiver, terminal or end-terminal. FIG. 1 illustrates various use-cases of media synchronization in general, in that the media stream A 020 and media stream B 022, originating from a media stream A originator 110 and a media stream B originator 112, respectively, may provide two different camera views, whereas media stream C originator 114 may be from a value-added-service provider providing a media stream C 024 in the form of, e.g., a commentator audio stream. For example, the commentator may be viewing media stream B 022 and providing his or her comments using media stream C 024.

The media distribution network 101 is shown to comprise stream modifiers 120, 122 in the form of a transcoder 120 and a multiplexer 122, in short also referred to as mixer. The transcoder 120 is shown to transcode media stream B 022, thereby providing a transcoded version of media stream B 040, whereas the multiplexer 122 is shown to multiplex media stream B 022 with media stream C 024, thereby establishing a mixed media stream 042. The above media streams 020-042 are shown to be delivered to various user equipment to illustrate following use-cases Hybrid TV Use-Cases:

1. UE1 181 may be a hybrid TV which receives a main broadcast media stream as a DVB stream from media stream originator 1 and receives an ancillary media stream as MPEG-DASH stream from media stream originator 2.

2. UE1 181 may also be a hybrid TV which receives a main broadcast media stream as a DVB stream from media stream originator 1 and receives an ancillary media stream as RTP/IP stream from media stream originator 2.

3. UE1 181 may also be a hybrid TV which receives the main media stream as an Internet Protocol TV (IPTV) multicast stream from media stream originator 1 and receives an ancillary media stream as RTP/IP stream from media stream originator 2.

Social TV Use-Cases:

1. UE2 182 and UE3 183 may be two TVs used for social TV. UE2 may receive a media stream from media stream originator 2 while UE3 may receive a transcoded version of the same media stream.

2. UE2 182 and UE4 184 may be two TVs used for social TV. UE4 may receive a mixed media stream that combines media streams from media stream originators 2 and 3.

Companion Screen Use-Cases:

1. UE2 182 may be a TV and UE3 183 may be a tablet device. One media stream may be played on the TV and a transcoded version of that media stream may be played on the tablet device.

2. UE2 182 may be a TV and UE5 185 may be a tablet device. One media stream may be played on the TV and a different media stream on the tablet device.

It will be appreciated that the above described use-cases establish a need for media synchronization. The present invention may be advantageously used to enable such media synchronization, and in particular but not limited to, for devices in or associated with a segmented media distribution network. Here, the term segmented media distribution network refers to a media distribution network which comprises several segments which each distribute one or more media streams across.

Figure 2:
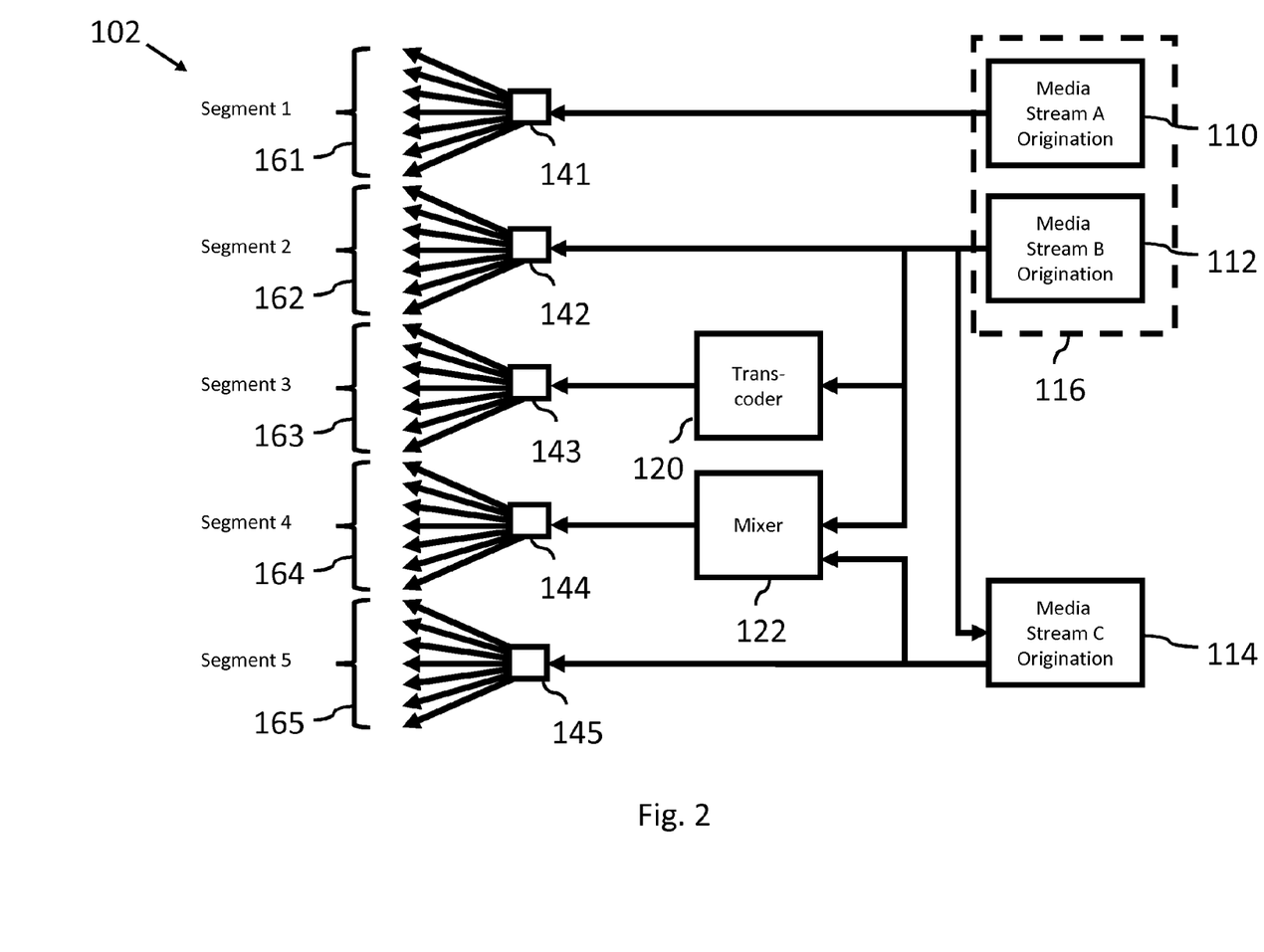
FIG. 2 illustrates a segmented media distribution network.

FIG. 2 shows an example of such a segmented media distribution network 103. The media distribution network 103 is shown to comprise media stream originators 110-114 and stream modifiers 120, 122 in the form of a transcoder 120 and a multiplexer 122. A difference with respect to the media distribution network of FIG. 1 is that in FIG. 2 the media streams are shown to be delivered to head-ends 141-145 of the media distribution network 103, with each of the head-ends acting as a distribution point for a plurality of devices, such as a plurality of receivers of respective end users. Accordingly, the head-end establish a number of segments 161-165 of the media distribution network 103 which each comprise a different plurality of devices.

Figure 3:
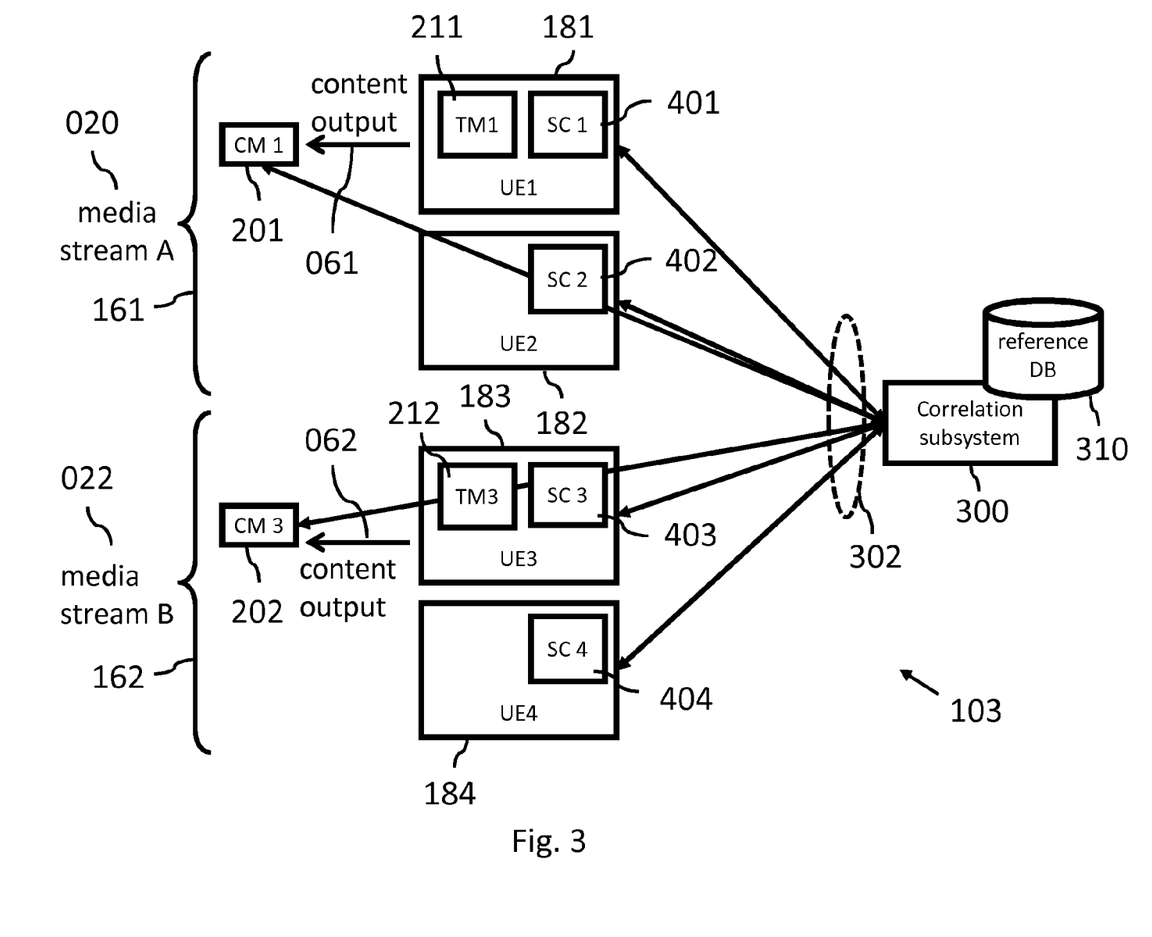
FIG. 3 shows a system according to the present invention in which persistent identifications are obtained by capturing media content outputted by receiver.

FIG. 3 shows a system enabling correlating timeline information between a first media stream, i.e., media stream A 020, and a second media stream, i.e., media stream B 022, in accordance with the present invention. Here, the media stream A and the media stream B are both associated with a common play-out timeline. FIG. 3 further shows four receivers, namely a first receiver 181, a second receiver 182, a third receiver 183 and a fourth receiver 184. The receivers are shown to be comprised in two clusters, namely a first cluster 161 comprising the first receiver 181 and the second receiver 182 and a second cluster 162 comprising the third receiver 183 and the fourth receiver 184. In the example of FIG. 3, the receivers 191, 192 in the first cluster 161 each have access to the media stream A and the receivers 193, 194 in the second cluster 162 each have access to the media stream B. Said access may be provided by the media streams being streamed to the receivers, being available to the receivers in the form of a file or a combination of the above. It is further noted that the clusters may correspond to the aforementioned segments of the segmented media distribution network shown in FIG. 2 in that the first receiver 181 and the second receiver 182 may be comprised in a first segment and the third receiver 183 and the fourth receiver 184 may be comprised in a second segment of the media distribution network.

FIG. 3 further shows two content monitors according to the present invention, namely a first content monitor 201 and a second content monitor 202. Each of at least two content monitors may be arranged for providing a persistent identification of one or more media samples of a media stream, the persistent identification being data which can be reproducibly obtained using the media stream. FIG. 3 shows the first content monitor 201 obtaining a persistent identification of the media stream A and the second content monitor 202 obtaining a persistent identification of the media stream B. By way of example, FIG. 3 shows each content monitor 201, 202 obtaining the persistent identification of the respective media stream from a capture of a play-out of the media stream by the first receiver 211 and the second receiver 183, respectively. However, this is not a limitation in that one or more of the content monitors 201, 202 may also obtain the persistent identification in another manner, for example by directly analyzing the respective media stream. For example, the content monitor may be part of the receiver, while the timeline monitor may be part of a network element upstream in the content distribution network, e.g. on a home gateway in the local network where the receiver resides or on a network node even further upstream. The accuracy of the media synchronization may here depend on the delay difference between content monitor and timeline monitor between various segments. If the delay between timeline monitor and content monitor is, e.g. 2 seconds in a first segment and 1 second in a second segment, an inaccuracy of 1 second may be introduced in the correlation. However, this inaccuracy may be compensated for if such delays are known, e.g., based on a measurement of the delays in the network.

FIG. 3 further shows two timeline monitors, namely a first timeline monitor 211 and a second timeline monitor 212. Each of the at least two timeline monitors 211, 212 may be arranged for providing a timestamp value from timeline information of a media stream. FIG. 3 illustrates the first timeline monitor 201 providing a timestamp value of the media stream A and the second timeline monitor 202 providing a timestamp of the media stream B. Each timeline monitor 201, 202 is shown to be comprised in a receiver from a different cluster 161, 162, namely the first timeline monitor 201 being comprised in the first receiver 181, thereby having access to media stream A, and the second timeline monitor being comprised in the third receiver 183, thereby having access to media stream B. It will be appreciated that, alternatively, each timeline monitor may also be located separately from the respective receivers in the different segments or clusters, e.g., by being implemented as a stand-alone entity.

FIG. 3 further shows a correlation subsystem 300. In accordance with the present invention, the correlation subsystem 300 may be arranged for receiving a persistent identification of the media stream A, i.e., a first persistent identification, related in time with a persistent identification of the media stream B, i.e., a second persistent identification. Furthermore, the correlation subsystem 300 may be arranged for receiving a timestamp value from timeline information of the media stream A, i.e., a first timestamp value, related in time with a timestamp value from timeline information of the media stream B, i.e., a second timestamp value. For that purpose, the correlation subsystem 300 may communicate with each of the content monitors 201, 202 and timeline monitors 211, 212, e.g., via an exchange of messages 302.

The correlation subsystem 300 may then match the first persistent identification to a first play-out time on the common play-out timeline and the second persistent identification to a second play-out time on the common play-out timeline. For that purpose, the correlation subsystem 300 may make use of identification information. The identification information may comprise, e.g., a plurality of persistent identifications and an associated plurality of play-out times on the common play-out timeline, thereby enabling the correlation subsystem 300 to match both persistent identifications to different play-out times on the common play-out timeline. The identification information may be comprised in a database 310. The identification information may be reference information in that it may be pre-generated or pre-loaded. As such, the database 310 may be a reference database. The identification information may also be generated by the correlation subsystem 300 itself, e.g., by the content monitors and timeline monitors providing regular output to the correlation subsystem 300 and the correlation subsystem 300 storing said output in the database 310.

Having matched the first persistent identification to a first play-out time on the common play-out timeline and the second persistent identification to a second play-out time on the common play-out timeline, the correlation subsystem 300 may then generate correlation information based on a comparison of the first play-out time with the second play-out time. This enables the correlation subsystem to correlate the first timestamp value with the second timestamp value and thereby correlate the timeline information of media stream A with the timeline information of media stream B.

FIG. 3 further shows a synchronization subsystem for performing a synchronization action with respect to the first and/or the second media stream. Here, the synchronization subsystem is comprised of a plurality of synchronization clients 401-404 which in turn are comprised in the receivers 181-184. Moreover, the correlation subsystem 300 is shown to function as a synchronization server by providing timing information to enable the synchronization clients to perform a synchronization action based on the timeline information of the other media stream.

Accordingly, by means of the timing information, the first synchronization client 401 comprised in the first cluster 161 may perform a synchronization action with respect to media stream A based on the timeline information of media stream B, whereas the third synchronization client 403 comprised in the second cluster 162 may perform a synchronization action with respect to media stream B based on the timeline information of media stream A. In general, such a synchronization action may be, e.g., a media stream buffering or skipping ahead to enable synchronized playback of the first media stream and/or the second media stream on a plurality of receivers, a media stream buffering or skipping ahead to enable synchronized playback of the first media stream with the second media stream on a receiver, or a triggering of an application on a receiver in synchronization with a media stream play-out on the receiver. For example, the timing information provided by the correlation subsystem 300 may enable media stream A in the first cluster 161 to be synchronously played-out with media stream B in the second cluster 162. Note that with media stream buffering, both on-demand and live streams may be synchronized, as both types of streams may be buffered. However, with skipping-ahead, only on-demand streams (including time-shifted television) may be skipped ahead. In case of, e.g. time-shifted television, only a short amount of time, i.e. the time that is shifted, may be skipped ahead It is noted that in order for the correlation subsystem 300 to receive the first persistent identification and the second persistent identification related in time, various options exists. This also applies to the correlation subsystem 300 receiving the first timestamp value and the second timestamp value related in time. For example, the content monitors 201, 202 may synchronously in time obtain the persistent identification from the respective media streams and synchronously in time provide the persistent identification to the correlation subsystem 300. For that purpose, the content monitors 201, 202 may make use of a common or synchronized wallclock. Said synchronized providing may also be triggered by a request from the correlation subsystem to both content monitors simultaneously. Similarly, the timeline monitors 211, 212 may synchronously in time obtain the timestamp value from the timeline information of the respective media streams and synchronously in provide the timestamp value to the correlation subsystem 300. For that purpose, the timeline monitors 211, 212 may also make use of a common or synchronized wallclock. Said synchronized providing may also be triggered by a request from the correlation subsystem to both timeline monitors simultaneously.

Figure 4:
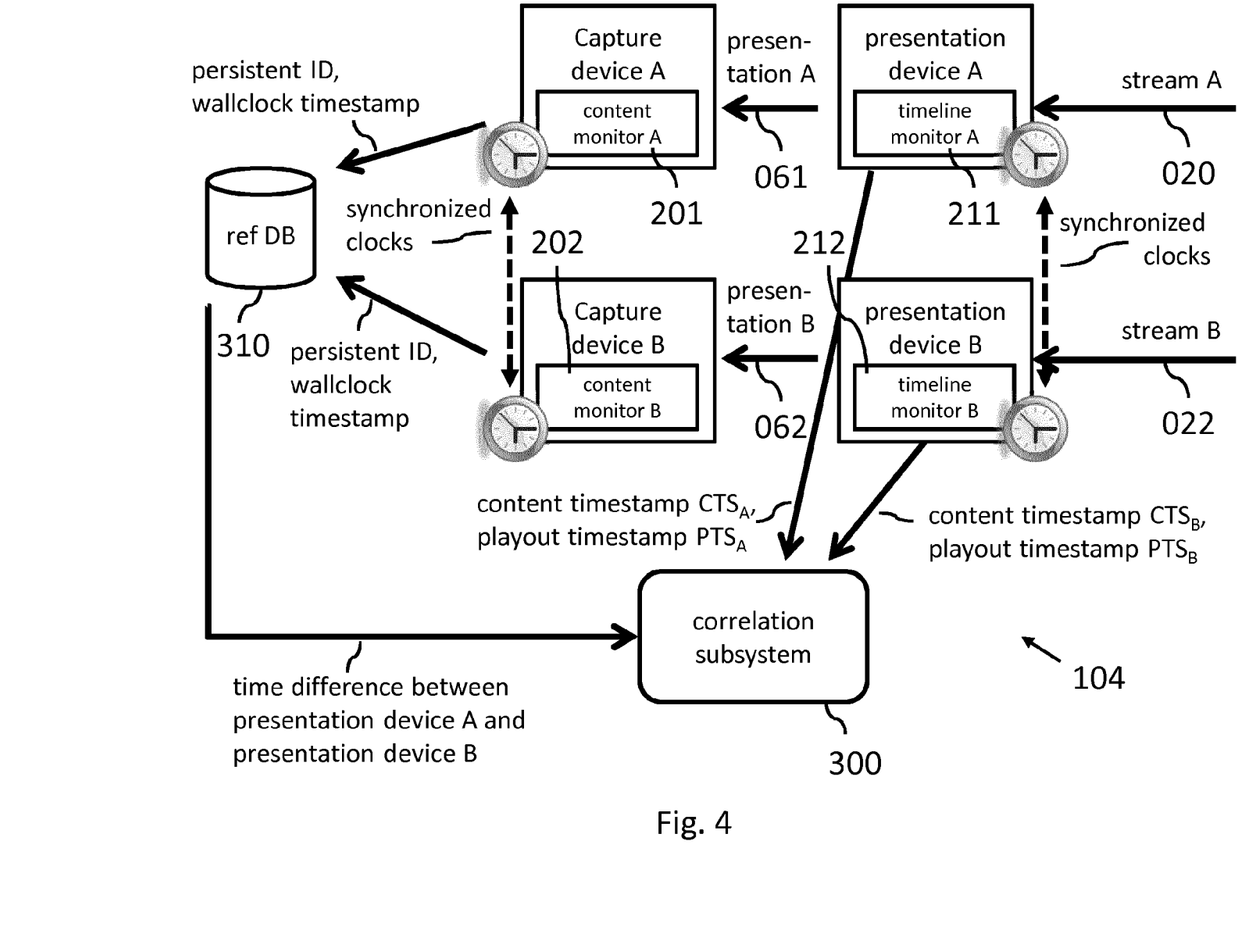
FIG. 4 shows another system according to the present invention which employs a different mechanism for receiving information from content monitors related in time and information from timeline monitors related in time.

FIG. 4 shows another example of the system according to the present invention. Here, a different mechanism is used for the correlation subsystem 300 receiving the first persistent identification and the second persistent identification related in time and receiving the first timestamp value and the second timestamp value related in time. FIG. 4 shows two receivers in the form of a presentation device A and a presentation device B, with presentation device A receiving or otherwise accessing media stream A and presentation device B receiving or otherwise accessing media stream B. Presentation device A comprises the timeline monitor A 211 whereas presentation device B comprises the timeline monitor B 212. The presentation devices A and B may be, e.g., a television, a set-top box, an audio receiver, etc. Both presentation devices may be of a same type but also of a different type. For example, presentation device A may be a television for playing-out a video stream A and presentation device B may be an audio receiver for playing-out an audio stream B providing commentary on the video stream A. FIG. 4 further shows two capture devices, namely a capture device A comprising the content monitor A 201 and a capture device B comprising the content monitor B 202. Each capture device may be, e.g., a tablet device, smartphone, etc. Capture device A is shown to capture a play-out of the presentation device A, i.e., of media stream A, whereas capture device B is shown to capture a play-out of the presentation device B, i.e., of media stream B. Such capture may be, e.g., a video recording, an audio recording, etc. Accordingly, each content monitor may be enabled to obtain the persistent identifications of one or more media samples of the respective media streams based on the captured output of their play-out, e.g., by applying fingerprinting or watermark detection to the captured output.

FIG. 4 shows the correlation subsystem 300 receiving the first persistent identification and the second persistent identification related in time as follows, namely by each of the content monitors 201, 202 being arranged for determining a wallclock timestamp value associated with the persistent identification based on a clock signal which is synchronized between the at least two content monitors, and providing the wallclock timestamp value together with the persistent identification to the correlation subsystem. This is illustrated in FIG. 4 by the content monitor A and the content monitor B having access to synchronized clocks. FIG. 4 further shows said output being directly matched to a content of a database 310, thereby matching the first persistent identification to a first play-out time on the common play-out timeline and the second persistent identification to a second play-out time on the common play-out timeline. Accordingly, the correlation subsystem 300 is enabled to determine a difference in play-out time between the presentation device A and the presentation device B.

FIG. 4 further shows the correlation subsystem 300 receiving the first timestamp value and the second timestamp value related in time as follows, namely by each of the timeline monitors 211, 212 being arranged for determining a wallclock timestamp value associated with the timestamp value based on a clock signal which is synchronized between the at least two timeline monitors, and providing the wallclock timestamp value together with the timestamp value to the correlation subsystem. In particular, the first timeline monitor 211 is shown to provide a timestamp value from the timeline information of media stream A, namely a Content TimeStamp (CTS) value $CTS_A$, together with a Playout TimeStamp (PTS) value $PTS_A$, whereas second timeline monitor 212 is shown to provide a timestamp value from the timeline information of media stream B, namely a content timestamp value $CTS_B$, together with a playout timestamp value $PTS_B$. Here, each playout timestamp value is derived from the synchronized wallclock and thus in fact constitutes an example of a wallclock timestamp value. In this example, the playout timestamp value may be obtained from the wallclock at an approximate time when playing-out or otherwise processing a fragment of the media stream with which the content timestamp value is associated.

The following provides a more detailed example of the operation of the system. In this example, it is assumed that the difference in play-out timing between the two presentation devices A and B is 4 seconds with presentation device A being in front, i.e., presentation device A being 4 seconds earlier when playing out a certain part of the content compared to presentation device B. This difference in play-out timing may have already been established by the correlation subsystem based on the output of the content monitors A and B. Further, it is assumed that the timeline monitors A and B provide the following information to the correlation subsystem:

Timeline monitor A reports CTS 1:23:45 at PTS 20:23:45
Timeline monitor B reports CTS 8:45:56 at PTS 20:23:50

For sake of simplicity, the timestamps in the above example are all in a format using regular time, i.e. hours/minutes/seconds. In practice, the timestamps may or may not have different offsets, different granularity and different frequencies. For calculation purposes, the semantics of the timestamps may need to be known or estimated, in particular the frequencies (i.e., the amount the timestamp increases per time unit, e.g., 90000 Hz is quite common for video, increasing by 90000 each second).

In this respect, it is noted that having repeated timestamp values from timeline information may enable the correlation subsystem to determine this frequency. As an example, if a first timestamp value 1,800,000 is at a wallclock time of 12:34:45 and a second timestamp value of the same timeline information, i.e., of the same media stream, is 2,700,000 at wallclock time 12:34:55, the correlation subsystem may establish an increase of 900,000 in 10 seconds, and thus determine that the timeline information from this media stream has a frequency of 90,000. It is noted that inaccurate clocks (e.g. clock drift) or network jitter may have an influence on the accuracy of this determination, and repeated measurements may counter such effects.

In this example, it can be determined at what CTS value presentation device B is 4 seconds later in time compared to presentation device A. Considering the PTS value of 20:23:45 of presentation device A, the PTS value of presentation device B may be determined to be 20:23:49 (4 seconds later compared to A). This provides a CTS value of 8:45:55, since the reporting for presentation device B was sent at 20:23:50, i.e., 1 second later than desired. Accordingly, it may be determined by the correlation subsystem that $CTS_A$ of 1:23:45 correlates to $CTS_B$ of 8:45:55. Based on this correlation, the timeline information of the media stream A may in general be correlated to the timeline information of the media stream B, i.e., by applying the above offset or other function to other timestamp values, thereby effectively enabling the correlation subsystem to translate timeline information between both media streams.

It is noted that another way of relating in time, is if both content monitors send their information over connections with little and/or known delay to the same entity, i.e. the same correlation subsystem. With little and/or known delay is meant, that if both content monitors send their information to the correlation subsystem, that the correlation subsystem can determine the time at which the information was determined by the content monitors. This may require that the content monitors send their information immediately after determining their information, i.e. their persistent identification, or with a known delay, e.g. send it 5 seconds after the beginning of the media sample or samples to which the persistent identification applies. This way, the correlation subsystem may put the timestamp on the persistent identification received, and subtract the known delay between the content monitor determining the persistent identification and the correlation subsystem receiving said identification.

A method for enabling correlating timeline information between a first media stream and a second media stream, with the first media stream and the second media stream being both associated with a common play-out timeline, may comprise, in a first step titled "RECEIVING PERSISTENT IDENTIFICATIONS RELATED IN TIME", receiving a first persistent identification of the first media stream related in time with a second persistent identification of the second media stream, each of said persistent identifications being data which can be reproducibly obtained using the respective media stream. The method may further comprise, in a second step titled "RECEIVING TIMESTAMP VALUES RELATED IN TIME", receiving a first timestamp value from timeline information of the first media stream related in time with a second timestamp value from timeline information of the second media stream. The method may further comprise, in third step titled "MATCHING PERSISTENT IDENTIFICATIONS TO PLAY-OUT TIMELINE", matching the first persistent identification to a first play-out time on the common play-out timeline and the second persistent identification to a second play-out time on the common play-out timeline. The method may further comprise, in a fourth step titled "GENERATING CORRELATION INFORMATION", generating correlation information based on a comparison of the first play-out time with the second play-out time for enabling correlating the first timestamp value with the second timestamp value and thereby correlating the first timeline information with the second timeline information. It is noted that the above steps may be performed in any suitable order. In particular, the first step and the second step may be performed simultaneously or in any sequential order. Moreover, a computer program product may comprise instructions for causing a processor system to perform the method. The computer program product may also be distributed, in that different instructions may be provided to cause different processor systems to jointly perform the method.

It is noted that, in general, the persistent identifications as obtained by the stream monitors may be comprised of a fingerprint, a watermark or a marker, or a combination of said persistent identifications, but are not limited to these examples.

In this respect, it is noted that the term 'fingerprinting' refers to a technique which is known per se from the field of computer science, and which attempts to uniquely identify, i.e., establish an identity, of a relatively large amount of data using a relatively small amount of data, i.e., the fingerprint. For example, hashes of the large amount of data or even (small) ranges thereof may be used. The stream monitors may make use of such known techniques, such as video fingerprinting and/or audio fingerprinting. The fingerprinting may be on the basis of a specific media sample, e.g., a video frame, an audio sample, a time-text-sample, etc, or of a (short) range of media samples, e.g. a few seconds of audio or a number of consecutive video frames. Accordingly, the fingerprinting may need to be repeated regularly if it is desired to match an arbitrary fingerprint in time to another arbitrary fingerprint. Alternatively, fingerprints may be directly compared with each other to determine if they match and thus relate to a same play-out time. The term 'watermarking' refers to a technique which is known per se from the field of computer science as well. Also watermarking may be needed to be repeated regularly. The term 'marker' refers to markers which are included in the media stream in a persistent manner, such as digital markers in the codec, markers in the MPEG-TS, markers in RTP or RTCP, etc.

It is noted that if markers are included in a media stream, this may require the content monitor to have access to this media stream, e.g., to the bitstream of the media stream. It is further noted that when using such synchronization markers, it may be possible to insert information in the markers themselves, e.g., give each marker a unique identification or even number them in sequence. When different content monitors report on markers detected in a media stream, this allows an easy and direct matching of such a first detected marker to a second detected marker.

In general, a timeline monitor may be co-located with a synchronization client. The timeline monitor may also be implemented as a software component in a plurality of synchronization clients but activated once or a limited number of times per segment, etc. Also, if synchronization clients can receive multiple streams in the same segment, e.g. in an IPTV segment, different clients may each perform the monitoring function for different streams, e.g., for different TV channels.

The content monitor and/or the timeline monitor may report to a correlation subsystem in a synchronization server such as an MSAS. Here, the term MSAS refers a Media Synchronization Application Server (MSAS) described in WO 2010106075 A1, in particular in paragraph [0073] and further. The content monitor and/or the timeline monitor may also report to a correlation subsystem comprised in a synchronization client. The content monitor and/or the timeline monitor may report to the correlation subsystem at regular intervals. The reporting may be regular or irregularly provided, e.g., only at discontinuities in timestamps or in other timing data, e.g., each time a new program is started or when the current program is interrupted by an interstitial.

In general, the correlation subsystem may be a separate entity within the media distribution network. The correlation subsystem may extrapolate identification information to preceding or subsequent media samples from earlier obtained identification information. The correlation subsystem may relay the correlation information to the synchronization clients in the Hybrid TV use-case. The correlation subsystem may also use the correlation information to generate timing information for the synchronization clients in the Social TV and Companion Screen use-cases. The correlation subsystem may be embodied as a distributed system with multiple interconnecting, possibly hierarchically arranged MSASes. The correlation subsystem may be enabled to assign a synchronization client to a segment based on manual configuration. The correlation subsystem may also be enabled to assign a synchronization client to a segment based on a signaling solution.

It is further noted that the examples in this application follow the so-termed synchronization maestro scheme (SMS, a client-server model). However, the present invention is also applicable to other synchronization schemes such as a distributed control scheme (DCS) or a master-slave scheme, as discussed in the earlier mentioned article "*Multimedia group and inter-stream synchronization techniques: A comparative study*" by F. Boronat et al., Elsevier Information Systems, 34, 2009, pp. 108-131.

In general, it is noted that synchronization does not always have to be entirely accurate. For example, in the use-case of social TV, a play-out timing difference of a few 100 ms and even up to 1 or 2 seconds may not be noticed by users. However, in case of local synchronization of several media streams, either on one device such as a Hybrid Broadcast Broadband TV (HbbTV) or on a TV and a companion screen, more accurate synchronization may be needed. Yet even in these use-cases, lip sync errors remain undetectable up to approximately 120 ms (between 95 ms video on front to about 25 ms audio in front). Therefore, it will be appreciated that within the context of the present invention, the term 'media synchronization' may refer to a degree of synchronization which achieves a satisfactory end-user experience.

Moreover, such entirely accurate synchronization can only be carried out on play-out timing, i.e. report and influence the actual time media is presented to the user. However, this timing is not always available. There are other points on which to report timing or to influence timing, i.e., any point addressable in the content chain in the receiver device would do. This can be from the moment the content is received (packet receipt times), packet processed, packet decoded, etc. Where in this text timing is discussed for synchronization purposes, any of these timings is applicable.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for enabling correlating timeline information between a first media stream and a second media stream, the first media stream and the second media stream being both associated with a common play-out timeline and comprising different timeline information, and the system comprising:
   at least two content monitors, each arranged for providing a persistent identification of one or more media samples of a media stream, the persistent identification being data wherein the persistent identification is one of the group of: a fingerprint, a watermark and a marker, of the one or more media samples, wherein the at least two content monitors comprise a first content monitor for providing a first persistent identification of the first media stream and a second content monitor for providing a second persistent identification of the second media stream, wherein each of the at least two content monitors are further arranged for providing the respective persistent identifications related in time a) by obtaining the respective persistent identifications synchronously in time or b) by providing a wallclock timestamp value together with the respective timestamp value;
   at least two timeline monitors, each of the at least two timeline monitors being arranged for providing a timestamp value from timestamp values in headers of a media stream, wherein the at least two timeline monitors comprise a first timeline monitor for providing the first timestamp value of the first media stream and a second timeline monitor for providing the second timestamp value of the second media stream, wherein each of the at least two timeline monitors are further arranged for providing the respective timestamp values related in time aa) by obtaining the respective timestamp values synchronously in time or bb) by providing a further wallclock timestamp value together with the respective timestamp value; and
   a correlation subsystem arranged for:
   i) receiving the first persistent identification and the second persistent identification,
   ii) receiving a first timestamp value from timeline information of the first media stream and a second timestamp value from timeline information of the second media stream,
   iii) matching the first persistent identification to a first play-out time on the common play-out timeline and the second persistent identification to a second play-out time on the common play-out timeline, and
   iv) generating correlation information based on a comparison of the first play-out time with the second play-out time for enabling correlating the first timestamp value with the second timestamp value and thereby correlating the first timeline information with the second timeline information.

2. The system according to claim 1, wherein the first persistent identification and the second persistent identification are received related in time based on each of the at least two content monitors being arranged for:
   i) determining a wallclock timestamp value associated with the persistent identification based on a clock signal which is synchronized between the at least two content monitors, and
   ii) providing the wallclock timestamp value together with the persistent identification to the correlation subsystem.

3. The system according to claim 1, wherein the first persistent identification and the second persistent identification are received related in time based on each of the at least two content monitors synchronously in time obtaining the persistent identification and providing the persistent identification to the correlation subsystem.

4. The system according to claim 1, wherein the first timestamp value and the second timestamp value are received related in time based on each of the at least two timeline monitors being arranged for:
   i) determining a wallclock timestamp value associated with the timestamp value based on a clock signal which is synchronized between the at least two timeline monitors, and
   ii) providing the wallclock timestamp value together with the timestamp value to the correlation subsystem.

5. The system according to claim 1, wherein the first timestamp value and the second timestamp value are received related in time based on each of the at least two timeline monitors synchronously in time obtaining the timestamp value and providing the timestamp value to the correlation subsystem.

6. The system according to claim 1, wherein the first media stream is distributed via a first segment of a media distribution network and the second media stream is distributed via a second segment of the media distribution network, and wherein the first content monitor and the first timeline monitor are associated with the first segment and the second content monitor and the second timeline monitor are associated with the second segment.

7. The system according to claim 6, wherein the media distribution network comprises a synchronization subsystem for performing a synchronization action with respect to the second media stream, and wherein the correlation subsystem is arranged for providing timing information for enabling the synchronization subsystem to perform the synchronization action based on the timeline information of the first media stream.

8. The system according to claim 7, wherein the synchronization action is one of the group of:
   a media stream buffering or skipping ahead to enable synchronized playback of the first media stream and/or the second media stream on a plurality of receivers,
   a media stream buffering or skipping ahead to enable synchronized playback of the first media stream with the second media stream on a receiver, and
   a triggering of an application on a receiver in synchronization with a media stream play-out on the receiver.

9. The system according to claim 1, wherein one or more of the at least two content monitors is arranged for obtaining the persistent identification of the media stream from a capture of a play-out of the media stream.

10. Content monitor, timeline monitor and/or correlation subsystem as used in the system according to claim 1.

11. Synchronization client for use in the system according to claim 7, the synchronization client being part of the synchronization subsystem and being arranged for identifying the segment of the media distribution network in which the synchronization client is comprised to the correlation subsystem.

12. Method for enabling correlating timeline information between a first media stream and a second media stream, the first media stream and the second media stream being both associated with a common play-out timeline and comprising different timeline information, and the method comprising:
   receiving a first persistent identification of the first media stream with a second persistent identification of the second media stream where the first persistent identification and the second persistent identification are related in time a) by obtaining the respective persistent identifications synchronously in time or b) by providing a wallclock timestamp value together with the respective timestamp value, each of said persistent identifications being data wherein the respective persistent identifications are one of the group of: a fingerprint, a watermark and a marker;
   receiving a first timestamp value from timestamp values in headers of the first media stream and a second timestamp value from timestamp values in headers of the second media stream, where the first timestamp value and the second timestamp value are related in time aa) by obtaining the respective timestamp values synchronously in time or bb) by providing a further wallclock timestamp value together with the respective timestamp value;
   matching the first persistent identification to a first play-out time on the common play-out timeline and the second persistent identification to a second play-out time on the common play-out timeline, and
   generating correlation information based on a comparison of the first play-out time with the second play-out time for enabling correlating the first timestamp value with the second timestamp value and thereby correlating the first timeline information with the second timeline information.

13. A non-transitory computer readable medium comprising instructions for causing a processor system to perform the method according to claim 12.

\* \* \* \* \*